(12) United States Patent
Kenrich et al.

(10) Patent No.: US 7,555,558 B1
(45) Date of Patent: Jun. 30, 2009

(54) METHOD AND SYSTEM FOR FAULT-TOLERANT TRANSFER OF FILES ACROSS A NETWORK

(76) Inventors: Michael Frederick Kenrich, 335 Beach Dr., Aptos, CA (US) 95003; Hal S. Hildebrand, 655 Sierra St., Moss Beach, CA (US) 94038; Senthilvasan Supramaniam, 1487 Ormsby Dr., Sunnyvale, CA (US) 94087

(*) Notice: Subject to any disclaimer, the term of this patent is extended or adjusted under 35 U.S.C. 154(b) by 1095 days.

(21) Appl. No.: 10/642,041

(22) Filed: Aug. 15, 2003

(51) Int. Cl.
*G06F 15/16* (2006.01)
(52) U.S. Cl. .................. 709/232; 709/203; 709/217
(58) Field of Classification Search .......... 709/203, 709/217–219, 230–232
See application file for complete search history.

(56) References Cited

U.S. PATENT DOCUMENTS

| | | | |
|---|---|---|---|
| 4,203,166 A | 5/1980 | Eshram et al. |
| 4,734,568 A | 3/1988 | Watanabe |
| 4,757,533 A | 7/1988 | Allen et al. |
| 4,796,220 A | 1/1989 | Wolfe |
| 4,799,258 A | 1/1989 | Davies |
| 4,827,508 A | 5/1989 | Shear |
| 4,888,800 A | 12/1989 | Marshall et al. |
| 4,972,472 A | 11/1990 | Brown et al. |
| 5,032,979 A | 7/1991 | Hecht et al. |
| 5,052,040 A | 9/1991 | Preston et al. |
| 5,058,164 A | 10/1991 | Elmer et al. |
| 5,144,660 A | 9/1992 | Rose |
| 5,204,897 A | 4/1993 | Wyman |
| 5,220,657 A | 6/1993 | Bly et al. |
| 5,235,641 A | 8/1993 | Nozawa et al. |
| 5,247,575 A | 9/1993 | Sprague et al. |
| 5,276,735 A | 1/1994 | Boebert et al. |
| 5,301,247 A | 4/1994 | Rasmussen et al. |
| 5,319,705 A | 6/1994 | Halter et al. |
| 5,369,702 A | 11/1994 | Shanton |
| 5,375,169 A | 12/1994 | Seheidt et al. |
| 5,404,404 A | 4/1995 | Novorita |
| 5,406,628 A | 4/1995 | Beller et al. |
| 5,414,852 A | 5/1995 | Kramer et al. |

(Continued)

FOREIGN PATENT DOCUMENTS

EP 0 672 991 A2 9/1995

(Continued)

OTHER PUBLICATIONS

Expiration Mechanism for Chipcards, IBM Technical Disclosure Bulletin, Oct. 1, 2001, UK.

(Continued)

*Primary Examiner*—Phuoc Nguyen
(74) *Attorney, Agent, or Firm*—Sterne, Kessler, Goldstein & Fox PLLC

(57) ABSTRACT

Improved techniques for transferring files through a multi-tier computing environment are disclosed. The transfer of files across the multiple tiers of the computing environment can use staging at intermediate tiers to facilitate the file transfer. Each tier can include at least one computing machine that includes a file transfer manager. The file transfer managers at the computing machines in each of the multiple tiers serve to effectuate the file transfer through the multi-tier computing environment. In one embodiment, the multi-tier computing environment is a multi-tier file security system and the files being transferred are audit files.

11 Claims, 9 Drawing Sheets

U.S. PATENT DOCUMENTS

| | | | |
|---|---|---|---|
| 5,495,533 A | 2/1996 | Linehan et al. | |
| 5,499,297 A | 3/1996 | Boebert | |
| 5,502,766 A | 3/1996 | Boebert et al. | |
| 5,535,375 A | 7/1996 | Eshel et al. | |
| 5,557,765 A | 9/1996 | Lipner et al. | |
| 5,570,108 A | 10/1996 | McLaughlin et al. | |
| 5,584,023 A | 12/1996 | Hsu | |
| 5,600,722 A | 2/1997 | Yamaguchi et al. | |
| 5,606,663 A | 2/1997 | Kadooka | |
| 5,655,119 A | 8/1997 | Davy | |
| 5,661,806 A | 8/1997 | Nevoux et al. | |
| 5,671,412 A | 9/1997 | Christiano | |
| 5,673,316 A | 9/1997 | Auerbach et al. | |
| 5,677,953 A | 10/1997 | Dolphin | |
| 5,680,452 A | 10/1997 | Shanton | |
| 5,684,987 A | 11/1997 | Mamiya et al. | |
| 5,689,718 A | 11/1997 | Sakurai et al. | |
| 5,699,428 A | 12/1997 | McDonnal et al. | |
| 5,708,709 A | 1/1998 | Rose | |
| 5,715,403 A | 2/1998 | Stefik | |
| 5,717,755 A | 2/1998 | Shanton | |
| 5,720,033 A | 2/1998 | Deo | |
| 5,729,734 A | 3/1998 | Parker et al. | |
| 5,732,265 A | 3/1998 | Dewitt et al. | |
| 5,745,573 A | 4/1998 | Lipner et al. | |
| 5,748,736 A | 5/1998 | Mittra | |
| 5,751,287 A | 5/1998 | Hahn et al. | |
| 5,757,920 A | 5/1998 | Misra et al. | |
| 5,765,152 A | 6/1998 | Ericson | |
| 5,778,065 A | 7/1998 | Hauser et al. | |
| 5,787,169 A | 7/1998 | Eldridge et al. | |
| 5,787,173 A | 7/1998 | Seheidt et al. | |
| 5,787,175 A | 7/1998 | Carter | |
| 5,790,789 A | 8/1998 | Suarez | |
| 5,790,790 A | 8/1998 | Smith et al. | |
| 5,813,009 A | 9/1998 | Johnson et al. | |
| 5,821,933 A | 10/1998 | Keller et al. | |
| 5,825,876 A | 10/1998 | Peterson | |
| 5,835,592 A | 11/1998 | Chang et al. | |
| 5,835,601 A | 11/1998 | Shimbo et al. | |
| 5,857,189 A | 1/1999 | Riddle | |
| 5,862,325 A | 1/1999 | Reed et al. | |
| 5,870,468 A | 2/1999 | Harrison | |
| 5,870,477 A | 2/1999 | Sasaki et al. | |
| 5,881,287 A | 3/1999 | Mast | |
| 5,892,900 A | 4/1999 | Ginter et al. | |
| 5,893,084 A | 4/1999 | Morgan et al. | |
| 5,898,781 A | 4/1999 | Shanton | |
| 5,922,073 A | 7/1999 | Shimada | |
| 5,923,754 A | 7/1999 | Angelo et al. | |
| 5,933,498 A | 8/1999 | Schnek et al. | |
| 5,944,794 A | 8/1999 | Okamoto et al. | |
| 5,953,419 A | 9/1999 | Lohstroh et al. | |
| 5,968,177 A | 10/1999 | Batten-Carew et al. | |
| 5,970,502 A * | 10/1999 | Salkewicz et al. | 707/201 |
| 5,987,440 A | 11/1999 | O'Neil et al. | |
| 5,991,879 A | 11/1999 | Still | |
| 5,999,907 A | 12/1999 | Donner | |
| 6,014,730 A | 1/2000 | Ohtsu | |
| 6,023,506 A | 2/2000 | Ote et al. | |
| 6,032,216 A | 2/2000 | Schmuck et al. | |
| 6,038,322 A | 3/2000 | Harkins | |
| 6,044,155 A | 3/2000 | Thomlinson et al. | |
| 6,055,314 A | 4/2000 | Spies et al. | |
| 6,058,424 A | 5/2000 | Dixon et al. | |
| 6,061,790 A | 5/2000 | Bodnar | |
| 6,069,057 A | 5/2000 | Richards | |
| 6,085,323 A | 7/2000 | Shimizu et al. | |
| 6,088,717 A | 7/2000 | Reed et al. | |
| 6,088,805 A | 7/2000 | Davis et al. | |
| 6,098,056 A | 8/2000 | Rusnak et al. | |
| 6,101,507 A | 8/2000 | Cane et al. | |
| 6,105,131 A | 8/2000 | Carroll | |
| 6,122,630 A * | 9/2000 | Strickler et al. | 707/8 |
| 6,134,327 A | 10/2000 | Van Oorschot | |
| 6,134,658 A | 10/2000 | Multerer et al. | |
| 6,134,660 A | 10/2000 | Boneh et al. | |
| 6,134,664 A * | 10/2000 | Walker | 726/22 |
| 6,141,754 A | 10/2000 | Choy | |
| 6,145,084 A | 11/2000 | Zuili | |
| 6,158,010 A | 12/2000 | Moriconi et al. | |
| 6,161,139 A | 12/2000 | Win et al. | |
| 6,182,142 B1 | 1/2001 | Win et al. | |
| 6,185,684 B1 | 2/2001 | Pravetz et al. | |
| 6,192,408 B1 | 2/2001 | Vahalia et al. | |
| 6,205,549 B1 | 3/2001 | Pravetz et al. | |
| 6,212,561 B1 | 4/2001 | Sitaraman et al. | |
| 6,223,285 B1 | 4/2001 | Komuro et al. | |
| 6,226,618 B1 | 5/2001 | Downs et al. | |
| 6,226,745 B1 | 5/2001 | Wiederhold et al. | |
| 6,240,188 B1 | 5/2001 | Dondeti et al. | |
| 6,249,873 B1 | 6/2001 | Richard et al. | |
| 6,253,193 B1 | 6/2001 | Ginter et al. | |
| 6,260,040 B1 | 7/2001 | Kauffman et al. | |
| 6,260,141 B1 | 7/2001 | Park | |
| 6,263,348 B1 | 7/2001 | Kathrow et al. | |
| 6,272,631 B1 | 8/2001 | Thomlinson et al. | |
| 6,272,632 B1 | 8/2001 | Carman et al. | |
| 6,282,649 B1 | 8/2001 | Lambert et al. | |
| 6,289,450 B1 | 9/2001 | Pensak et al. | |
| 6,292,895 B1 | 9/2001 | Baltzley | |
| 6,292,899 B1 | 9/2001 | McBride | |
| 6,295,361 B1 | 9/2001 | Kadansky et al. | |
| 6,301,614 B1 | 10/2001 | Najork et al. | |
| 6,308,256 B1 | 10/2001 | Folmsbee | |
| 6,308,273 B1 | 10/2001 | Goertzel et al. | |
| 6,314,409 B2 | 11/2001 | Schnek et al. | |
| 6,317,777 B1 | 11/2001 | Skarbo et al. | |
| 6,332,025 B2 | 12/2001 | Takahashi et al. | |
| 6,336,114 B1 | 1/2002 | Garrison | |
| 6,339,423 B1 | 1/2002 | Sampson et al. | |
| 6,339,825 B2 | 1/2002 | Pensak et al. | |
| 6,341,164 B1 | 1/2002 | Dilkie et al. | |
| 6,343,316 B1 | 1/2002 | Sakata | |
| 6,347,374 B1 | 2/2002 | Drake et al. | |
| 6,349,337 B1 | 2/2002 | Parsons et al. | |
| 6,351,813 B1 | 2/2002 | Mooney et al. | |
| 6,356,903 B1 | 3/2002 | Baxter et al. | |
| 6,356,941 B1 | 3/2002 | Cohen | |
| 6,357,010 B1 | 3/2002 | Viets et al. | |
| 6,363,480 B1 | 3/2002 | Perlman | |
| 6,370,249 B1 | 4/2002 | Van Oorschot | |
| 6,381,698 B1 | 4/2002 | Devanbu et al. | |
| 6,389,433 B1 | 5/2002 | Bolosky et al. | |
| 6,389,538 B1 | 5/2002 | Gruse et al. | |
| 6,393,420 B1 | 5/2002 | Peters | |
| 6,405,315 B1 | 6/2002 | Burns et al. | |
| 6,421,714 B1 | 7/2002 | Rai et al. | |
| 6,442,688 B1 | 8/2002 | Moses et al. | |
| 6,442,695 B1 | 8/2002 | Dutcher et al. | |
| 6,446,090 B1 * | 9/2002 | Hart | 707/201 |
| 6,449,721 B1 | 9/2002 | Pensak et al. | |
| 6,453,353 B1 | 9/2002 | Win et al. | |
| 6,466,932 B1 | 10/2002 | Dennis et al. | |
| 6,477,544 B1 | 11/2002 | Bolosky et al. | |
| 6,490,680 B1 | 12/2002 | Scheidt et al. | |
| 6,505,300 B2 | 1/2003 | Chan et al. | |
| 6,510,349 B1 | 1/2003 | Schnek et al. | |
| 6,519,700 B1 | 2/2003 | Ram et al. | |
| 6,529,956 B1 | 3/2003 | Smith et al. | |
| 6,530,020 B1 | 3/2003 | Aoki | |
| 6,530,024 B1 | 3/2003 | Proctor | |
| 6,542,608 B2 | 4/2003 | Scheidt et al. | |
| 6,549,623 B1 | 4/2003 | Scheidt et al. | |

| Patent | Date | Inventor |
|---|---|---|
| 6,550,011 B1 | 4/2003 | Sims |
| 6,557,039 B1 | 4/2003 | Leong et al. |
| 6,567,914 B1 | 5/2003 | Just et al. |
| 6,571,291 B1 | 5/2003 | Chow |
| 6,584,466 B1 | 6/2003 | Serbinis et al. |
| 6,587,946 B1 | 7/2003 | Jakobsson |
| 6,588,673 B1 | 7/2003 | Chan et al. |
| 6,594,662 B1 | 7/2003 | Sieffert et al. |
| 6,598,161 B1 | 7/2003 | Kluttz et al. |
| 6,603,857 B1 | 8/2003 | Batten-Carew et al. |
| 6,608,636 B1 | 8/2003 | Roseman |
| 6,611,599 B2 | 8/2003 | Natarajan |
| 6,611,846 B1 | 8/2003 | Stoodley |
| 6,615,349 B1 | 9/2003 | Hair |
| 6,615,350 B1 | 9/2003 | Schell et al. |
| 6,625,650 B2 | 9/2003 | Stelliga |
| 6,629,243 B1 | 9/2003 | Kleinman et al. |
| 6,633,311 B1 | 10/2003 | Douvikas et al. |
| 6,640,307 B2 | 10/2003 | Viets et al. |
| 6,646,515 B2 | 11/2003 | Jun et al. |
| 6,647,388 B2 | 11/2003 | Numao et al. |
| 6,678,835 B1 | 1/2004 | Shah et al. |
| 6,687,822 B1 | 2/2004 | Jakobsson |
| 6,711,683 B1 | 3/2004 | Laczko et al. |
| 6,718,361 B1 | 4/2004 | Basani et al. |
| 6,735,701 B1 | 5/2004 | Jacobson |
| 6,738,908 B1 | 5/2004 | Bonn et al. |
| 6,775,779 B1 | 8/2004 | England et al. |
| 6,782,403 B1 | 8/2004 | Kino et al. |
| 6,801,999 B1 | 10/2004 | Venkatesan et al. |
| 6,807,534 B1 | 10/2004 | Erickson |
| 6,807,636 B2 | 10/2004 | Hartman et al. |
| 6,810,389 B1 | 10/2004 | Meyer |
| 6,810,479 B1 | 10/2004 | Barlow et al. |
| 6,816,871 B2 | 11/2004 | Lee |
| 6,826,698 B1 | 11/2004 | Minkin et al. |
| 6,834,333 B2 | 12/2004 | Yoshino et al. |
| 6,834,341 B1 | 12/2004 | Bahl et al. |
| 6,845,452 B1 | 1/2005 | Roddy et al. |
| 6,851,050 B2 | 2/2005 | Singhal et al. |
| 6,865,555 B2 | 3/2005 | Novak |
| 6,874,139 B2 | 3/2005 | Krueger et al. |
| 6,877,136 B2 | 4/2005 | Bess et al. |
| 6,889,210 B1 | 5/2005 | Vainstein |
| 6,891,953 B1 | 5/2005 | DeMello et al. |
| 6,892,201 B2 | 5/2005 | Brown et al. |
| 6,892,306 B1 | 5/2005 | En-Seung et al. |
| 6,907,034 B1 | 6/2005 | Begis |
| 6,909,708 B1 | 6/2005 | Krishnaswamy et al. |
| 6,915,434 B1 | 7/2005 | Kuroda et al. |
| 6,920,558 B2 | 7/2005 | Sames et al. |
| 6,931,450 B2 | 8/2005 | Howard et al. |
| 6,931,530 B2 | 8/2005 | Pham et al. |
| 6,931,597 B1 | 8/2005 | Prakash |
| 6,938,042 B2 | 8/2005 | Aboulhosn et al. |
| 6,941,355 B1 | 9/2005 | Donaghey et al. |
| 6,941,456 B2 | 9/2005 | Wilson |
| 6,941,472 B2 | 9/2005 | Moriconi et al. |
| 6,944,183 B1 | 9/2005 | Iyer et al. |
| 6,947,556 B1 | 9/2005 | Matyas, Jr. et al. |
| 6,950,818 B2 | 9/2005 | Dennis et al. |
| 6,950,936 B2 | 9/2005 | Subramaniam et al. |
| 6,950,941 B1 | 9/2005 | Lee et al. |
| 6,950,943 B1 | 9/2005 | Bacha et al. |
| 6,952,780 B2 | 10/2005 | Olsen et al. |
| 6,957,261 B2 | 10/2005 | Lortz |
| 6,959,308 B2 | 10/2005 | Gramsamer et al. |
| 6,961,849 B1 | 11/2005 | Davis et al. |
| 6,968,060 B1 | 11/2005 | Pinkas |
| 6,971,018 B1 | 11/2005 | Witt et al. |
| 6,978,376 B2 | 12/2005 | Giroux et al. |
| 6,978,377 B1 | 12/2005 | Asano et al. |
| 6,988,133 B1 | 1/2006 | Zavalkovsky et al. |
| 6,988,199 B2 | 1/2006 | Toh et al. |
| 6,993,135 B2 | 1/2006 | Ishibashi |
| 6,996,718 B1 | 2/2006 | Henry et al. |
| 7,003,117 B2 | 2/2006 | Kacker et al. |
| 7,003,560 B1 | 2/2006 | Mullen et al. |
| 7,003,661 B2 | 2/2006 | Beattie et al. |
| 7,013,332 B2 | 3/2006 | Friedel et al. |
| 7,013,485 B2 | 3/2006 | Brown et al. |
| 7,020,645 B2 | 3/2006 | Bisbee et al. |
| 7,024,427 B2 | 4/2006 | Bobbitt et al. |
| 7,035,854 B2 | 4/2006 | Hsiao et al. |
| 7,035,910 B1 | 4/2006 | Dutta et al. |
| 7,046,807 B2 | 5/2006 | Hirano et al. |
| 7,051,213 B1 | 5/2006 | Kobayashi et al. |
| 7,058,696 B1 | 6/2006 | Phillips et al. |
| 7,058,978 B2 | 6/2006 | Feuerstein et al. |
| 7,073,063 B2 | 7/2006 | Peinado |
| 7,073,073 B1 | 7/2006 | Nonaka et al. |
| 7,076,067 B2 | 7/2006 | Raike et al. |
| 7,076,312 B2 | 7/2006 | Law et al. |
| 7,076,469 B2 | 7/2006 | Schreiber et al. |
| 7,076,633 B2 | 7/2006 | Tormasov et al. |
| 7,080,077 B2 | 7/2006 | Ramamurthy et al. |
| 7,095,853 B2 | 8/2006 | Takuya |
| 7,096,266 B2 | 8/2006 | Lewin et al. |
| 7,099,926 B1 | 8/2006 | Ims et al. |
| 7,107,269 B2 | 9/2006 | Arlein et al. |
| 7,107,416 B2 | 9/2006 | Stuart et al. |
| 7,117,322 B2 | 10/2006 | Hochberg et al. |
| 7,120,635 B2 | 10/2006 | Bhide et al. |
| 7,120,757 B2 | 10/2006 | Tsuge |
| 7,124,164 B1 | 10/2006 | Chemtob |
| 7,130,964 B2 | 10/2006 | Ims et al. |
| 7,131,071 B2 | 10/2006 | Gune et al. |
| 7,134,041 B2 | 11/2006 | Murray et al. |
| 7,136,903 B1 | 11/2006 | Phillips et al. |
| 7,145,898 B1 | 12/2006 | Elliott |
| 7,146,388 B2 | 12/2006 | Stakutis et al. |
| 7,146,498 B1 | 12/2006 | Takechi et al. |
| 7,159,036 B2 | 1/2007 | Hinchliffe et al. |
| 7,171,557 B2 | 1/2007 | Kallahalla et al. |
| 7,174,563 B1 | 2/2007 | Brownlie et al. |
| 7,177,427 B1 | 2/2007 | Komuro et al. |
| 7,178,033 B1 | 2/2007 | Garcia |
| 7,181,017 B1 | 2/2007 | Nagel et al. |
| 7,185,364 B2 | 2/2007 | Knouse et al. |
| 7,187,033 B2 | 3/2007 | Pendharkar |
| 7,188,181 B1 | 3/2007 | Squier et al. |
| 7,194,764 B2 | 3/2007 | Martherus et al. |
| 7,200,747 B2 | 4/2007 | Riedel et al. |
| 7,203,317 B2 | 4/2007 | Kallahalla et al. |
| 7,203,968 B2 | 4/2007 | Asano et al. |
| 7,219,230 B2 | 5/2007 | Riedel et al. |
| 7,224,795 B2 | 5/2007 | Takada et al. |
| 7,225,256 B2 | 5/2007 | Villavicencio |
| 7,227,953 B2 | 6/2007 | Shida |
| 7,233,948 B1 | 6/2007 | Shamoon et al. |
| 7,237,002 B1 | 6/2007 | Estrada et al. |
| 7,249,044 B2 | 7/2007 | Kumar et al. |
| 7,260,555 B2 | 8/2007 | Rossmann et al. |
| 7,265,764 B2 | 9/2007 | Alben et al. |
| 7,266,684 B2 | 9/2007 | Jancula |
| 7,280,658 B2 | 10/2007 | Amini et al. |
| 7,287,055 B2 | 10/2007 | Smith et al. |
| 7,290,148 B2 | 10/2007 | Tozawa et al. |
| 7,308,702 B1 | 12/2007 | Thomsen et al. |
| 7,313,824 B1 | 12/2007 | Bala et al. |
| 7,319,752 B2 | 1/2008 | Asano et al. |
| 7,380,120 B1 | 5/2008 | Garcia |
| 7,383,586 B2 | 6/2008 | Cross et al. |
| 7,386,529 B2 | 6/2008 | Kiessig et al. |
| 2001/0011254 A1 | 8/2001 | Clark |
| 2001/0021926 A1 | 9/2001 | Schnek et al. |

| | | |
|---|---|---|
| 2001/0032181 A1 | 10/2001 | Jakstadt et al. |
| 2001/0034839 A1 | 10/2001 | Karjoth et al. |
| 2001/0044903 A1 | 11/2001 | Yamamoto et al. |
| 2001/0056550 A1 | 12/2001 | Lee |
| 2002/0010679 A1 | 1/2002 | Felsher |
| 2002/0016922 A1 | 2/2002 | Richards et al. |
| 2002/0031230 A1 | 3/2002 | Sweet et al. |
| 2002/0035624 A1 | 3/2002 | Kim |
| 2002/0046350 A1 | 4/2002 | Lordemann et al. |
| 2002/0050098 A1 | 5/2002 | Chan |
| 2002/0056042 A1 | 5/2002 | Van Der Kaay et al. |
| 2002/0062240 A1 | 5/2002 | Morinville |
| 2002/0062245 A1 | 5/2002 | Niu et al. |
| 2002/0069077 A1 | 6/2002 | Brophy et al. |
| 2002/0069272 A1 | 6/2002 | Kim et al. |
| 2002/0069363 A1 | 6/2002 | Winburn |
| 2002/0073320 A1 | 6/2002 | Rinkevich et al. |
| 2002/0077986 A1 | 6/2002 | Kobata et al. |
| 2002/0077988 A1 | 6/2002 | Sasaki et al. |
| 2002/0087479 A1 | 7/2002 | Malcolm |
| 2002/0099947 A1 | 7/2002 | Evans |
| 2002/0124180 A1 | 9/2002 | Hagman |
| 2002/0129235 A1 | 9/2002 | Okamoto et al. |
| 2002/0133699 A1 | 9/2002 | Pueschel |
| 2002/0138762 A1 | 9/2002 | Horne |
| 2002/0143710 A1 | 10/2002 | Liu |
| 2002/0143906 A1 | 10/2002 | Tormasov et al. |
| 2002/0156726 A1 | 10/2002 | Kleckner et al. |
| 2002/0157016 A1 | 10/2002 | Russell et al. |
| 2002/0169963 A1 | 11/2002 | Seder et al. |
| 2002/0169965 A1 | 11/2002 | Hale et al. |
| 2002/0172367 A1 | 11/2002 | Mulder et al. |
| 2002/0174109 A1 | 11/2002 | Chandy et al. |
| 2002/0176572 A1 | 11/2002 | Ananth |
| 2002/0178271 A1 | 11/2002 | Graham et al. |
| 2002/0194484 A1 | 12/2002 | Bolosky et al. |
| 2002/0198798 A1 | 12/2002 | Ludwig et al. |
| 2003/0009685 A1 | 1/2003 | Choo et al. |
| 2003/0014391 A1 | 1/2003 | Evans et al. |
| 2003/0023559 A1 | 1/2003 | Choi et al. |
| 2003/0028610 A1 | 2/2003 | Pearson |
| 2003/0033528 A1 | 2/2003 | Ozog et al. |
| 2003/0037133 A1 | 2/2003 | Owens |
| 2003/0037237 A1 | 2/2003 | Abgrall et al. |
| 2003/0037253 A1 | 2/2003 | Blank et al. |
| 2003/0046238 A1 | 3/2003 | Nonaka et al. |
| 2003/0051039 A1 | 3/2003 | Brown et al. |
| 2003/0056139 A1 | 3/2003 | Murray et al. |
| 2003/0074580 A1 | 4/2003 | Knouse et al. |
| 2003/0078959 A1 | 4/2003 | Yeung et al. |
| 2003/0079175 A1 | 4/2003 | Limantsev |
| 2003/0081784 A1 | 5/2003 | Kallahalla et al. |
| 2003/0081787 A1 | 5/2003 | Kallahalla et al. |
| 2003/0088517 A1 | 5/2003 | Medoff |
| 2003/0088783 A1 | 5/2003 | DiPierro |
| 2003/0101072 A1 | 5/2003 | Dick et al. |
| 2003/0110169 A1 | 6/2003 | Zuili |
| 2003/0110266 A1 | 6/2003 | Rollins et al. |
| 2003/0110397 A1 | 6/2003 | Supramaniam |
| 2003/0115146 A1 | 6/2003 | Lee et al. |
| 2003/0115570 A1 | 6/2003 | Bisceglia |
| 2003/0120601 A1 | 6/2003 | Ouye |
| 2003/0120684 A1 | 6/2003 | Zuili et al. |
| 2003/0126434 A1 | 7/2003 | Lim et al. |
| 2003/0154381 A1 | 8/2003 | Ouye |
| 2003/0159066 A1 | 8/2003 | Staw et al. |
| 2003/0177070 A1 | 9/2003 | Viswanath et al. |
| 2003/0177378 A1 | 9/2003 | Wittkotter |
| 2003/0182579 A1 | 9/2003 | Leporini et al. |
| 2003/0196096 A1 | 10/2003 | Sutton |
| 2003/0197729 A1 | 10/2003 | Denoue et al. |
| 2003/0200202 A1 | 10/2003 | Hsiao et al. |
| 2003/0217264 A1 | 11/2003 | Martin et al. |
| 2003/0217281 A1 | 11/2003 | Ryan |
| 2003/0217333 A1 | 11/2003 | Smith et al. |
| 2003/0226013 A1 | 12/2003 | Dutertre |
| 2003/0233650 A1 | 12/2003 | Zaner et al. |
| 2004/0022390 A1 | 2/2004 | McDonald et al. |
| 2004/0025037 A1 | 2/2004 | Hair |
| 2004/0039781 A1 | 2/2004 | LaVallee et al. |
| 2004/0064710 A1 | 4/2004 | Vainstein |
| 2004/0068524 A1 | 4/2004 | Aboulhosn et al. |
| 2004/0068664 A1 | 4/2004 | Nachenberg et al. |
| 2004/0073718 A1 | 4/2004 | Johannessen et al. |
| 2004/0088548 A1 | 5/2004 | Smetters et al. |
| 2004/0098580 A1 | 5/2004 | DeTreville |
| 2004/0103202 A1 | 5/2004 | Hildebrand et al. |
| 2004/0103280 A1 | 5/2004 | Balfanz et al. |
| 2004/0133544 A1 | 7/2004 | Kiessig et al. |
| 2004/0158586 A1 | 8/2004 | Tsai |
| 2004/0193602 A1 | 9/2004 | Liu et al. |
| 2004/0193905 A1 | 9/2004 | Lirov et al. |
| 2004/0193912 A1 | 9/2004 | Li et al. |
| 2004/0199514 A1 | 10/2004 | Rosenblatt et al. |
| 2004/0215956 A1 | 10/2004 | Venkatachary et al. |
| 2004/0215962 A1 | 10/2004 | Douceur et al. |
| 2004/0243853 A1 | 12/2004 | Swander et al. |
| 2005/0021467 A1 | 1/2005 | Franzdonk |
| 2005/0021629 A1 | 1/2005 | Cannata et al. |
| 2005/0028006 A1 | 2/2005 | Leser et al. |
| 2005/0039034 A1 | 2/2005 | Doyle et al. |
| 2005/0071275 A1 | 3/2005 | Vainstein et al. |
| 2005/0071657 A1 | 3/2005 | Ryan |
| 2005/0071658 A1 | 3/2005 | Nath et al. |
| 2005/0081029 A1 | 4/2005 | Thornton et al. |
| 2005/0086531 A1 | 4/2005 | Kenrich |
| 2005/0091484 A1 | 4/2005 | Thornton et al. |
| 2005/0120199 A1 | 6/2005 | Carter |
| 2005/0138371 A1 | 6/2005 | Supramaniam |
| 2005/0138383 A1 | 6/2005 | Vainstein |
| 2005/0177716 A1 | 8/2005 | Ginter et al. |
| 2005/0177858 A1 | 8/2005 | Ueda |
| 2005/0198326 A1 | 9/2005 | Schlimmer et al. |
| 2005/0223242 A1 | 10/2005 | Nath |
| 2005/0223414 A1 | 10/2005 | Kenrich et al. |
| 2005/0235154 A1 | 10/2005 | Serret-Avila |
| 2005/0256909 A1 | 11/2005 | Aboulhosn et al. |
| 2005/0273600 A1 | 12/2005 | Seeman |
| 2005/0283610 A1 | 12/2005 | Serret-Avila et al. |
| 2005/0288961 A1 | 12/2005 | Tabrizi |
| 2006/0005021 A1 | 1/2006 | Torrubia-Saez |
| 2006/0075465 A1 | 4/2006 | Ramanathan et al. |
| 2006/0093150 A1 | 5/2006 | Reddy et al. |
| 2006/0168147 A1* | 7/2006 | Inoue et al. ................ 709/219 |
| 2006/0230437 A1 | 10/2006 | Boyer et al. |
| 2007/0006214 A1 | 1/2007 | Dubal et al. |
| 2007/0067837 A1 | 3/2007 | Schuster |

FOREIGN PATENT DOCUMENTS

| | | |
|---|---|---|
| EP | 0 674 253 A1 | 9/1995 |
| EP | 0 809 170 A1 | 11/1997 |
| EP | 0 913 966 A2 | 5/1999 |
| EP | 0 913 967 A2 | 5/1999 |
| EP | 0 950 941 A2 | 10/1999 |
| EP | 0 950 941 A3 | 10/1999 |
| EP | 1 107 504 B1 | 6/2001 |
| EP | 1 107 504 A2 | 6/2001 |
| EP | 1 130 492 A2 | 9/2001 |
| EP | 1 154 348 A2 | 11/2001 |
| EP | 1324565 A1 | 7/2003 |
| GB | 2 328 047 A | 2/1999 |
| JP | 2001-036517 | 2/2001 |
| WO | WO 96/41288 A1 | 12/1996 |
| WO | WO 00/56028 A2 | 9/2000 |
| WO | WO 01/61438 A2 | 8/2001 |

| | | | |
|---|---|---|---|
| WO | WO 01/63387 A2 | 8/2001 | |
| WO | WO 01/63387 A3 | 8/2001 | |
| WO | WO 01/77783 A2 | 10/2001 | |
| WO | WO 01/78285 A1 | 10/2001 | |
| WO | WO 01/84271 A2 | 11/2001 | |

OTHER PUBLICATIONS

McDaniel et al. "Antigone: A Flexible Framework for Secure Group Communication," Proceedings of the 8th USENIX Security Symposium, Aug. 23, 1999.
Stallings, William, "Cryptography and Network Security: Principles and Practice," 1999, pp. 333-337, Second Edition, Prentice Hall, Upper Saddle River, New Jersey.
"Affect," The American Heritage Dictionary of the English Language, Fourth Edition, Houghton Mifflin Company, 2002. Retrieved May 4, 2006 from http://dictionary.reference.com/search?q=affect.
"Inside Encryping file system," Part 1, from MSDN Oct. 2001 version, exact publication date is unknown but believed prior to Dec. 12, 2001.
"Inside Encryping file system," Part 2, from MSDN Oct. 2001 version, exact publication date is unknown but believed prior to Dec. 12, 2001.
"Security with Encryping File System," from MSDN Oct. 2001 version, exact publication date is unknown but believed prior to Dec. 12, 2001.
"How EFS work," from MSDN Oct. 2001 version, exact publication date is unknown but believed prior to Dec. 12, 2001.
"Encryping File System," from MSDN Oct. 2001 version, exact publication date is unknown but believed prior to Dec. 12, 2001.
"Features of EFS" from MSDN Oct. 2001 version, exact publication date is unknown but believed prior to Dec. 12, 2001.
"Windows 2000 EFS" in the Apr. 1999 issue of Windows NT magazine.
Microsoft Windows 200 server. Windows 2000 Group Policy White Paper, 2000.
Symantec. Norton Antivirus Corporate Edition Implementation Guide, 1999.
Crocker, Steven Toye, "Multi-level cryptographic transformations for securing digital assets,"U.S. Appl. No. 10/404,566, filed Mar. 31, 2003.
Crocker, Steven Toye, "Effectuating access policy changes to designated places for secured files," U.S. Appl. No. 10/259,075, filed Sep. 27, 2002.
Kenrich, Michael Frederick, "Multi-Level File Digest", U.S. Appl. No. 10/894,493, filed Jul. 19, 2004.
Kinghorn, Gary Mark, "Method and system for protecting electronic data in enterprise environment," U.S. Appl. No. 10/159,220, filed May 31, 2002.
Nath, Satyajit, "Method and system for securing digital assets using content type designations," U.S. Appl. No. 10/405,587, filed Apr. 1, 2003.
Prakash, Nalini J., "Method and apparatus for securing/unsecuring files by file crawling," U.S. Appl. No. 10/325,102, filed Dec. 20, 2002.
Rossmann, Alain, "Hybrid systems for securing digital assets," U.S. Appl. No. 10/325,013, filed Dec. 20, 2002.
A Real-Time Push-Pull Communications Model for Distributed Real-Time and Multimedia Systems, Jan. 1999, School of Computer Sciences Carnegie Mellon University, Kanaka Juvva, Raj Rajkumar.
U.S. Appl. No. 10/889,685, entitled "Method and Apparatus for Controlling the Speed Ranges of a Machine" inventor Thomas, Jul. 13, 2004, 18 pgs.
U.S. Appl. No. 10/028,397, entitled "Method and system for restricting use of a clipboard application," inventor Zuili, Dec. 21, 2001, 38 pgs.
U.S. Appl. No. 10/368,277, entitled "Method and apparatus for uniquely identifying files," inventor Ouye, Feb. 18, 2003, 25 pgs.
U.S. Appl. No. 10/327,320, entitled "Security system with staging capabilities" inventor Vainstein, Dec. 20, 2002, 39 pgs.
U.S. Appl. No. 10/286,524, entitled "Security system that uses indirect password-based encryption," inventor Gutnik, Nov. 1, 2002, 38 pgs.
U.S. Appl. No. 10/242,185, entitled "Method and system for protecting encrypted files transmitted over a network" inventor Ryan, Sep. 11, 2002, 33 pgs.
U.S. Appl. No. 10/610,832, entitled "Method and system for enabling users of a group shared across multiple file security systems to access secured files" inventor Ryan, Jun. 30, 2003, 33 pgs.
U.S. Appl. No. 10/448,806, entitled "Method and System for Using Remote Headers to Secure Electronic Files" inventor Ryan, May 30, 2003, 35 pgs.
U.S. Appl. No. 10/074,194, entitled "Methods for idnetifying compunds that inhibit or reduce PTP1B expressions" inventor Rondinone, Feb. 12, 2002, 69 pgs.
U.S. Appl. No. 10/074,804, entitled "Secured Data Format for Access Control," inventor Garcia, Feb. 12, 2002, 108 pgs.
U.S. Appl. No. 10/075,194, entitled "System and Method for Providing Multi-location Access Management to Secured Items," inventor Vainstein et al., Feb. 12, 2002, 110 pgs.
U.S. Appl. No. 10/074,996, entitled "Method and Apparatus for Securing Electronic Data," inventor Lee et al., Feb. 12, 2002, 111 pgs.
U.S. Appl. No. 10/074,825, entitled "Method and Apparatus for Accessing Secured Electronic Data Off-line," inventor Lee et al., Feb. 12, 2002, 108 pgs.
U.S. Appl. No. 10/105,532, entitled "System and Method for Providing Different Levels of Key Security for Controlling Access to Secured Items," inventor Hildebrand et al., Mar. 20, 2002, 86 pgs.
U.S. Appl. No. 10/186,203, entitled "Method and System for Implementing Changes to Security Policies in a Distributed Security System," inventor Huang, Jun. 26, 2002, 65 pgs.
U.S. Appl. No. 10/201,756, entitled "Managing Secured Files in Designated Locations," inventor Alain, Jul. 22, 2002, 121 pgs.
U.S. Appl. No. 10/206,737, entitled "Method and System for Updating Keys in a Distributed Security System," inventor Hildebrand, Jul. 26, 2002, 60 pgs.
U.S. Appl. No. 10/246,079, entitled "Security System for Generating Keys from Access rules in a Decentralized Manner and Methods Therefor," inventor Hildebrand, Sep. 17, 2002, 78 pgs.
U.S. Appl. No. 10/259,075, entitled "Effectuating Access Policy Changes to Designated Places for Secured Files," inventor Crocker, Sep. 27, 2002, 60 pgs.
U.S. Appl. No. 10/286,575, entitled "Method and Architecture for Providing Access to Secured Data from Non-Secured Clients," inventor Vainstein, Nov. 1, 2002, 46 pgs.
U.S. Appl. No. 10/295,363, entitled "Security System Using Indirect Key Generation from Access Rules and Methods Therefor," inventor Vainstein, Nov. 15, 2002, 70 pgs.
U.S. Appl. No. 11/889,310, entitled "Methods and Systems for Providing Access Control to Electronic Data," inventor Rossmann, Aug. 10, 2007, 90 pgs.
U.S. Appl. No. 11/797,367, entitled "Method and System for Managing Security Tiers," inventor Vainstein, May 2, 2007, 11 pgs.
Adobe Acrobat 5.0 Classroom in a Book, Adobe Press, Jun. 26, 2001, pp. 1-4.
Adobe Acrobat Security Settings, Acrobat 7.0, Nov. 15, 2004, pp. 1-4.
"Security Options". Dec. 20, 2001. DC & Co. pp. 1-2.
Microsoft Press Computer Dictionary, 1997, Microsoft Press, Third Edition, p. 426.
Search Report, completion date May 8, 2003, for European Patent Application No. EP 02 25 8530, 2 pages.
Search Report, completion date Oct. 2, 2003, for European Patent Application No. EP 02 25 8531, 2 pages.
Search Report, completion date Apr. 14, 2005, for European Patent Application No. EP 02 25 8533, 2 pages.
Search Report, completion date Mar. 16, 2005, for European Patent Application No. EP 02 25 8534, 2 pages.
Search Report, completion date Mar. 2, 2005, for European Patent Application No. EP 02 25 8535, 2 pages.
Search Report, completion date Mar. 3, 2005, for European Patent Application No. EP 02 25 8537, 2 pages.
Search Report, completion date May 12, 2005, for European Patent Application No. EP 02 25 8539, 2 pages.
Search Report, completion date Jul. 6, 2005, for European Patent Application No. EP 02 25 8529 4 pages.

Search Report, completion date Oct. 8, 2003, for European Patent Application No. EP 02 25 8536, 2 pages.

Search Report, completion date May 8, 2003, for European Patent Application No. EP 02 25 8540, 2 pages.

Examination Report, completion date Jun. 18, 2008, for European Patent Application No. EP 02 258 532.7-1244, 6 pgs.

Boneh et al., "Hierarchical Identity Based Encryption with Constant Size Ciphertext," Advances in Cryptology- Eurocrypt 2005, vol. 3493, Jun. 20, 2005, pp. 440-456.

Boneh et al., "IBE Secure E-mail," Stanford University, Apr. 8, 2002, http://crypto.stanford.edu/ibe/.

* cited by examiner

METHOD AND SYSTEM FOR FAULT-TOLERANT TRANSFER OF FILES ACROSS A NETWORK

CROSS-REFERENCE TO RELATED APPLICATION

This application is related to U.S. patent application Ser. No. 10/075,194, filed Feb. 12, 2002, and entitled "SYSTEM AND METHOD FOR PROVIDING MULTI-LOCATION ACCESS MANAGEMENT TO SECURED ITEMS," which is hereby incorporated herein by reference.

BACKGROUND OF THE INVENTION

1. Field of the Invention

The present invention relates to security systems for data and, more particularly, to security systems that produce audit files.

2. Description of the Related Art

Security systems can be used to restrict access to files (e.g., documents) through use of cryptography. Such security systems are often called file security systems or document security systems. Typically, the files (e.g., documents) are encrypted using a public key and then later decrypted by only those authorized users having an appropriate private key. It is advantageous to monitor security events of file security systems that occur over time. In this regard, file security systems can audit or log security events to an audit file (or log file). An audit file allows a security administrator to later review the security events that have occurred over time with respect to the file security system. Examples of security events could be failed attempts to open files, changes to authorized users, new security classifications, etc.

Furthermore, after audit files have been made, the audit files can be reviewed. The audit files enable a security administrator to diagnose conditions of the file security system. Typically, file security systems are often distributed across multiple machines and multiple locations, but are interconnected via a network. In contrast, the security administrator often resides at a central location. Hence, the file security system needs to transfer audit files to the central location. Unfortunately, however, if the audit files are locally created by local machines and then transmitted to the central location, the transmission of the audit files can involve the transfer of large amounts of data, which can hamper the ability of the file security system to operate as intended. Further complications result from the distributed, multi-tier file security system that uses multiple (possibly redundant) servers in multiple tiers.

Thus, there is a need for efficient and reliable methods to transmit audit files to a centralized audit location in an efficient and reliable manner so that subsequent audit analysis can be performed.

SUMMARY OF THE INVENTION

Broadly speaking, the invention relates to improved techniques for transferring files through a multi-tier computing environment. The transfer of files across the multiple tiers of the computing environment can use staging at intermediate tiers to facilitate the file transfer. Each tier can include at least one computing machine that includes a file transfer manager. The file transfer managers at the computing machines in each of the multiple tiers serve to effectuate the file transfer through the multi-tier computing environment.

In one embodiment, the multi-tier computing environment is a multi-tier file security system and the files being transferred are audit files. The multi-tier file security system provides efficient and reliable techniques to transfer audit files through the file security system. De-centralized audit files can thus be transmitted through the multi-tier file security system to a central location, e.g., an audit server, thereby facilitating review of the audit files.

The invention can be implemented in numerous ways, including as a method, system, device, and computer readable medium. Several embodiments of the invention are discussed below.

As a method for transferring a file from a local client to a remote server in a fault-tolerant manner, one embodiment of the invention includes at least the acts of: identifying a file to be transferred; dividing the file into a plurality of blocks; sending a next block of the plurality of blocks of the file to a receiver; receiving a returned status from the receiver; evaluating the returned status; repeating the acts of sending of the next block, receiving of the returned status and evaluating when the returned status is a first predetermined status; waiting for a predetermined period of time when the returned status is a second predetermined status; requesting, following the waiting for the predetermined period of time, an updated status from the remote receiver when the returned status is the second predetermined status; and concluding the transfer of the file when the returned status is a third predetermined status.

As a method for transferring a file from a sender computer to a receiver computer through at least one intermediate computer, one embodiment of the invention includes at least the acts of: sending the file block-by-block from the sender computer to the intermediate computer; staging the file at the intermediate computer once all of the blocks of the file have been received at the intermediate computer; thereafter sending the staged file block-by-block from the intermediate computer to the receiver computer; informing the intermediate computer once the receiver computer has all of the blocks of the staged file; and subsequently removing the staged file from the intermediate computer.

As a file transfer system for fault-tolerant file transfer over computers arranged in multiple tiers, one embodiment of the invention includes at least: a first computer that includes at least first data storage that stores a file to be transferred and a first file transfer manager; a second computer that includes at least a second file transfer manager and a second data storage that temporarily stores the file received from the first computer over a data transmission link; and a third computer that includes at least a third file transfer manager that receives the file from the second computer and a third data storage that stores the file, thereby completing the transfer of the file.

As a computer readable medium including at least computer program code for transferring a file from a sender computer to a receiver computer through at least one intermediate computer, one embodiment of the invention includes at least: computer program code for sending the file block-by-block from the sender computer to the intermediate computer; computer program code for staging the file at the intermediate computer once all of the blocks of the file have been received at the intermediate computer; computer program code for thereafter sending the staged file block-by-block from the intermediate computer to the receiver computer; computer program code for receiving status information at the intermediate computer that the receiver computer has all of the blocks of the staged file; and computer program code for subsequently removing the staged file from the intermediate computer after the status information is received.

Other aspects and advantages of the invention will become apparent from the following detailed description, taken in conjunction with the accompanying drawings which illustrate, by way of example, the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to improved techniques for transferring files through a multi-tier computing environment. The transfer of files across the multiple tiers of the computing environment can use staging at intermediate tiers to facilitate the file transfer. Each tier can include at least one computing machine that includes a file transfer manager. The file transfer managers at the computing machines in each of the multiple tiers serve to effectuate the file transfer through the multi-tier computing environment.

In one embodiment, the multi-tier computing environment is a multi-tier file security system and the files being transferred are audit files. The multi-tier file security system provides efficient and reliable techniques to transfer audit files through the file security system. De-centralized audit files can thus be transmitted through the multi-tier file security system to a central location, e.g., an audit server, thereby facilitating review of the audit files.

In the following description, numerous specific details are set forth in order to provide a thorough understanding of the invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the invention are discussed herein with reference to FIGS. 1-8. However, those skilled in the art will readily appreciate that the detailed description given herein with respect to these figures is for explanatory purposes as the invention extends beyond these limited embodiments.

Figure 1:
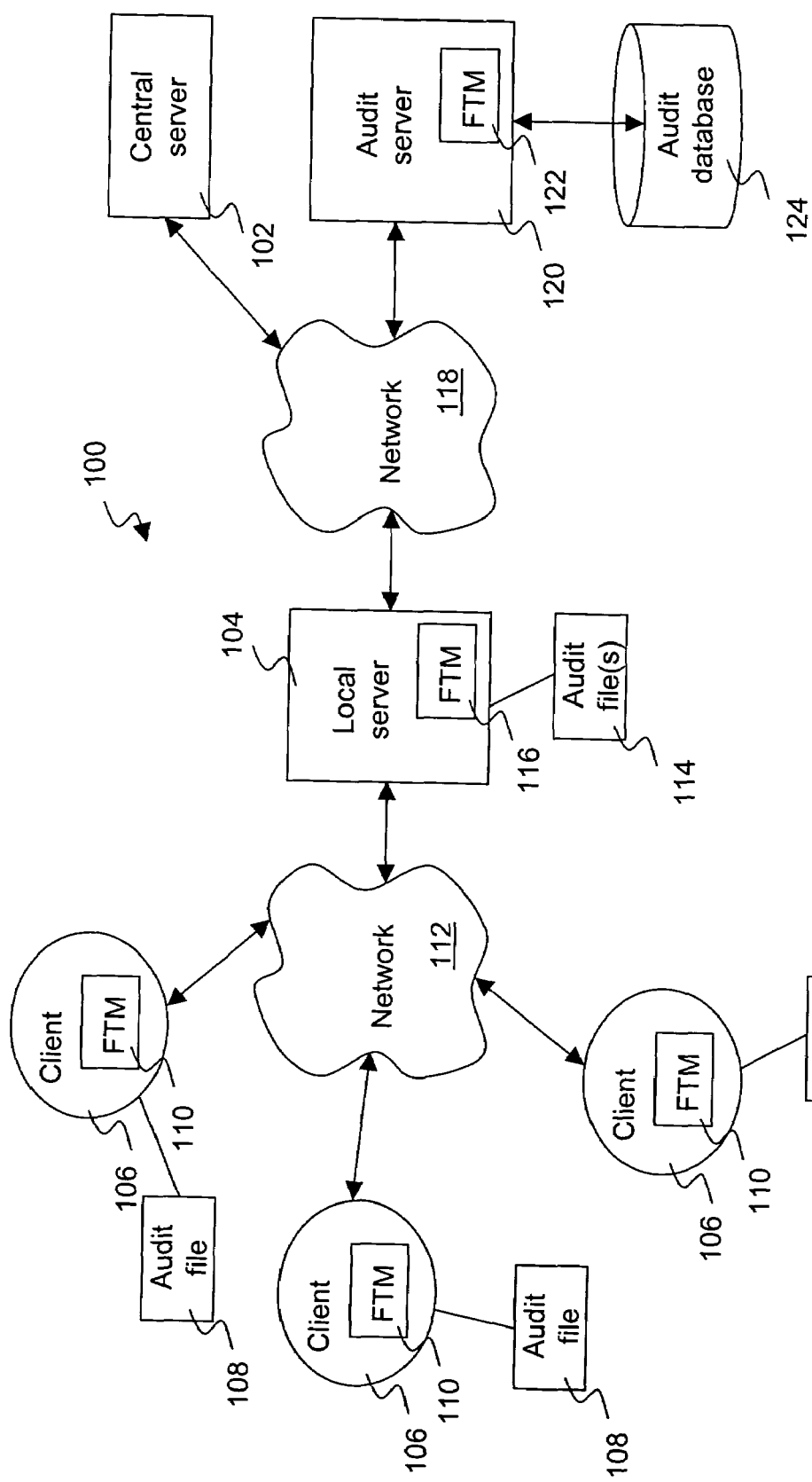
FIG. 1 is a block diagram of a file security system according to one embodiment of the invention.

FIG. 1 is a block diagram of a file security system 100 according to one embodiment of the invention. The file security system 100 operates to restrict access to files stored within a computing environment associated with the file security system 100. The computing environment is a distributed computing system having a central server 102, a local server 104 and clients 106. A user at one of the clients 106 can create a secured file having restricted access. For example, the access to the secured file can be limited to certain other users. The access to the secured file can also be limited to certain time periods, certain uses and/or certain other computers, etc. In gaining access to a secured file, a user at one of the clients 106 would interact with a local server 104 and/or the central server 102 to receive keys, access rules, user groups, etc. that are needed to gain access to the secured file.

Additionally, as the clients 106 operate in the context of the file security system 100 to provide restricted access to files, each computing machine within the file security system 100 can produce an audit file. Namely, the clients 106 can produce audit files 108 and the local server 104 can produce an audit file 114. In addition, the central server 102 might even produce an audit file. Typically, an administrator (e.g., security administrator) of the file security system 100 would interact with the central server 102. In one situation, the administrator would desire to review audit information that has been acquired by the file security system 100. The review of the audit files would allow the security administrator to diagnose problems with the system, detect attempts for unauthorized access, detect security breaches, and the like.

Hence, the audit files which are locally created by the various computing machines need to be transmitted to a central resource. The various computing devices make use of file transfer managers (FTMs) to transfer the audit files. Each of the clients 106 includes a file transfer manager (FTM) 110. The local server 104 also includes a file transfer manager 116.

As shown in FIG. 1, the clients 106 couple to a network 112. The local server 104 couples between the network 112 and a network 118. The central server 102, as well as an audit server 120, couple to the network 118. The audit server 120 is shown as a separate centralized server for managing the audit information acquired by the file security system 100. However, it should be noted that in another embodiment, the audit server 120 could be within the central server 102. The audit server 120 includes a file transfer manager 122 that communicates with the file transfer manager 116 within the local server 104. The file transfer manager 116 within the local server 114 communicates with one or more file transfer managers 110 within the clients 106. The audit server 120 further couples to an audit database 124. The audit database 124 contains the audit files that have been received at the audit server 120 from the computing devices within the file security system 100 (e.g., the clients 106 and the local server 104). The audit server 120 may also process the audit files prior to storage to the audit database 124. In any case, the security administrator for the file security system 100 can access the audit database 124 to review and analyze the audit files acquired by the various components of the file security system 100.

Figure 2:
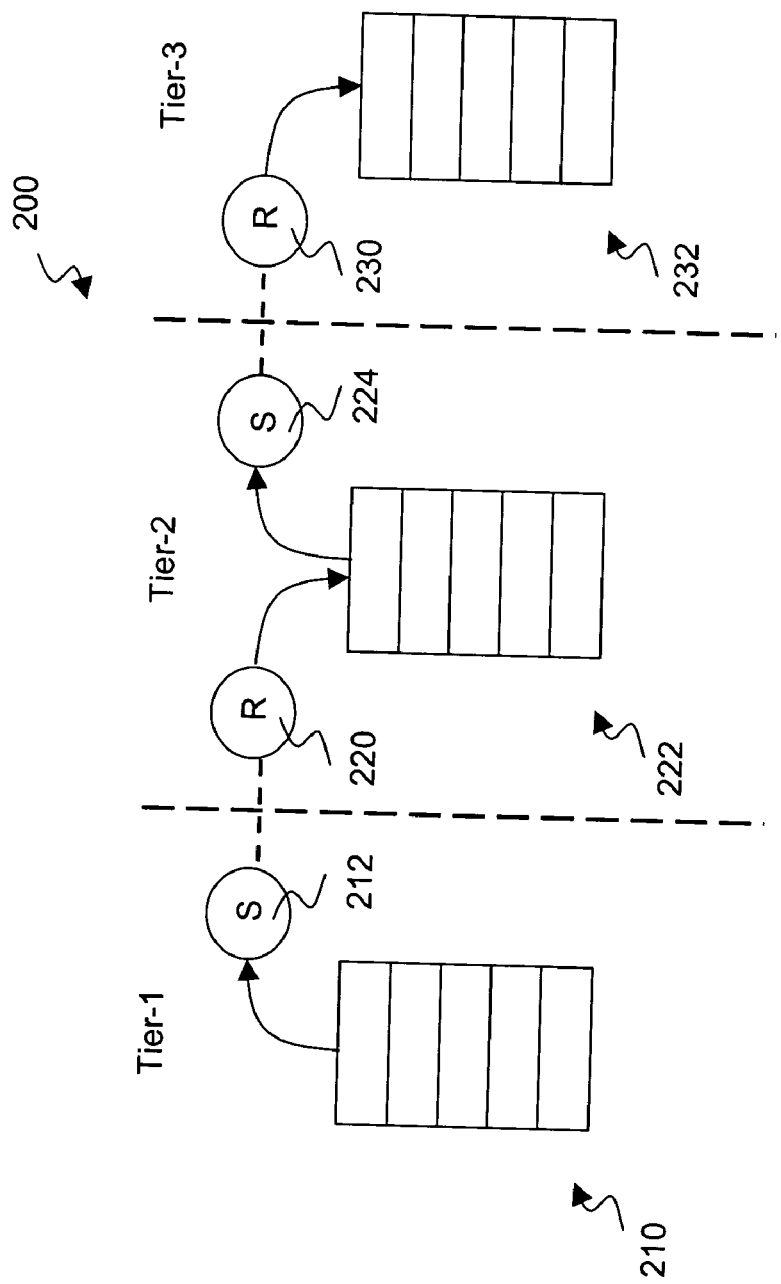
FIG. 2 is a diagram representing a multi-tier audit file transfer process according to one embodiment of the invention.

FIG. 2 is a diagram representing a multi-tier audit file transfer process 200 according to one embodiment of the invention. The multi-tier audit file transfer process 200 makes use of three tiers: tier-1, tier-2, and tier-3. In one embodiment, tier-1 corresponds to a client machine, tier-2 corresponds to an intervening server, and tier-3 corresponds to an endpoint server. As an example, with respect to FIG. 1, tier-1 can correspond to the clients 106, tier-2 can correspond to the local server 104, and tier-3 can correspond to the audit server 120.

Within each tier, the computing machine includes a file transfer manager (FTM) that operates as a sender and/or receiver of blocks of an audit file. Hence, as shown in FIG. 2, an audit file 210 is divided into a plurality of blocks of data. Each block of data is more manageable for transport to the next tier. A sender 212 within tier-1 operates to transmit the audit file 210 block-by-block to a receiver 220 within tier-2. The receiver 220 receives the incoming blocks and stores them to an audit file 222. Once the receiver 220 has successfully received all of the blocks of the audit file 210 and stored them to the audit file 222, a sender 224 within tier-2 can begin sending the audit file 222 block-by-block to a receiver 230 within tier-3. As the blocks of the audit file 222 are received by the receiver 230, the blocks are stored to an audit file 232. Once all of the blocks of the audit file 222 have been received by the receiver 230 and stored to the audit file 232, the transfer of the audit file is complete. The audit file 222 residing in tier-2 can be considered a staged version of the audit file 210 as it is merely residing in tier-2 temporarily until such time as tier-3 acquires all of the audit data being transmitted. In the event that the transfer between the sender 212 and the receiver 220 and/or the sender 224 and the receiver 230 have difficulty, the transmission protocol is fault-tolerant such that the transmission can be restarted as appropriate.

Figure 3:
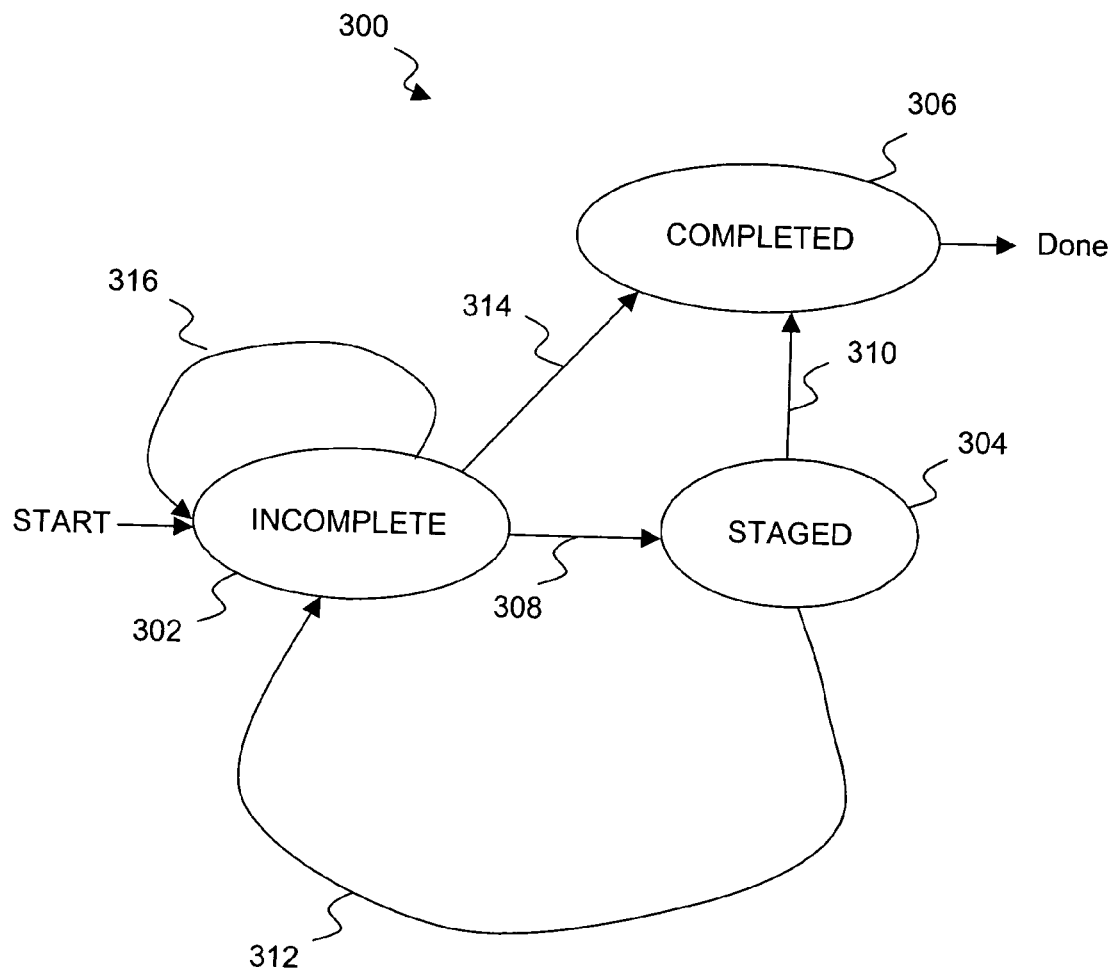
FIG. 3 is a diagram of a state machine for a file transfer manager according to one embodiment of the invention.

FIG. 3 is a diagram of a state machine 300 for a file transfer manager according to one embodiment of the invention. The file transfer manager can, for example, correspond to any of the file transfer managers (FTMs) 110, 116 or 122 shown in FIG. 1, or the senders 212, 224 or the receivers 220, 230 shown in FIG. 2.

The state machine 300 includes three states, namely, "incomplete" 302, "staged" 304 and "completed" 306. The state machine 300 pertains to the transfer of a file from one machine (e.g., computer) to another. When a file transfer is started, a state machine is initially within the "incomplete" state 302. As the data of the audit file being transferred is in transit, the state machine remains in the "incomplete" state 302. Once all of the data of the audit file has been successfully transferred, the state machine transitions 308 to the "staged" state 304, assuming that the recipient machine is not the final destination. From the "staged" state 304, the state machine transitions 310 to the "completed" state 306 once the state machine has been notified that that the transmission to the final destination machine has completed. At this point, the transfer of the audit file is completed. Hence, in the case in which the recipient machine is the final destination machine, then the state machine can transition 314 directly from the "incomplete" state 302 to the "completed" state 306.

Furthermore, for enhanced reliability, fault tolerance features are built-in to the state machine 300. In particular, the state machine 300 can transition 312 from the "staged" state 304 to the "incomplete" state 302 should the machine having the staged version of the audit file be shut down, fail, or otherwise lose ability to participate in the file transfer operation. Also, the state machine 300 allows the file transfer process to be restarted when communication errors or other technical problems exist. In particular, the state machine 300 can transition 316 from the "incomplete" state 302 to restart the transfer.

Figure 4:
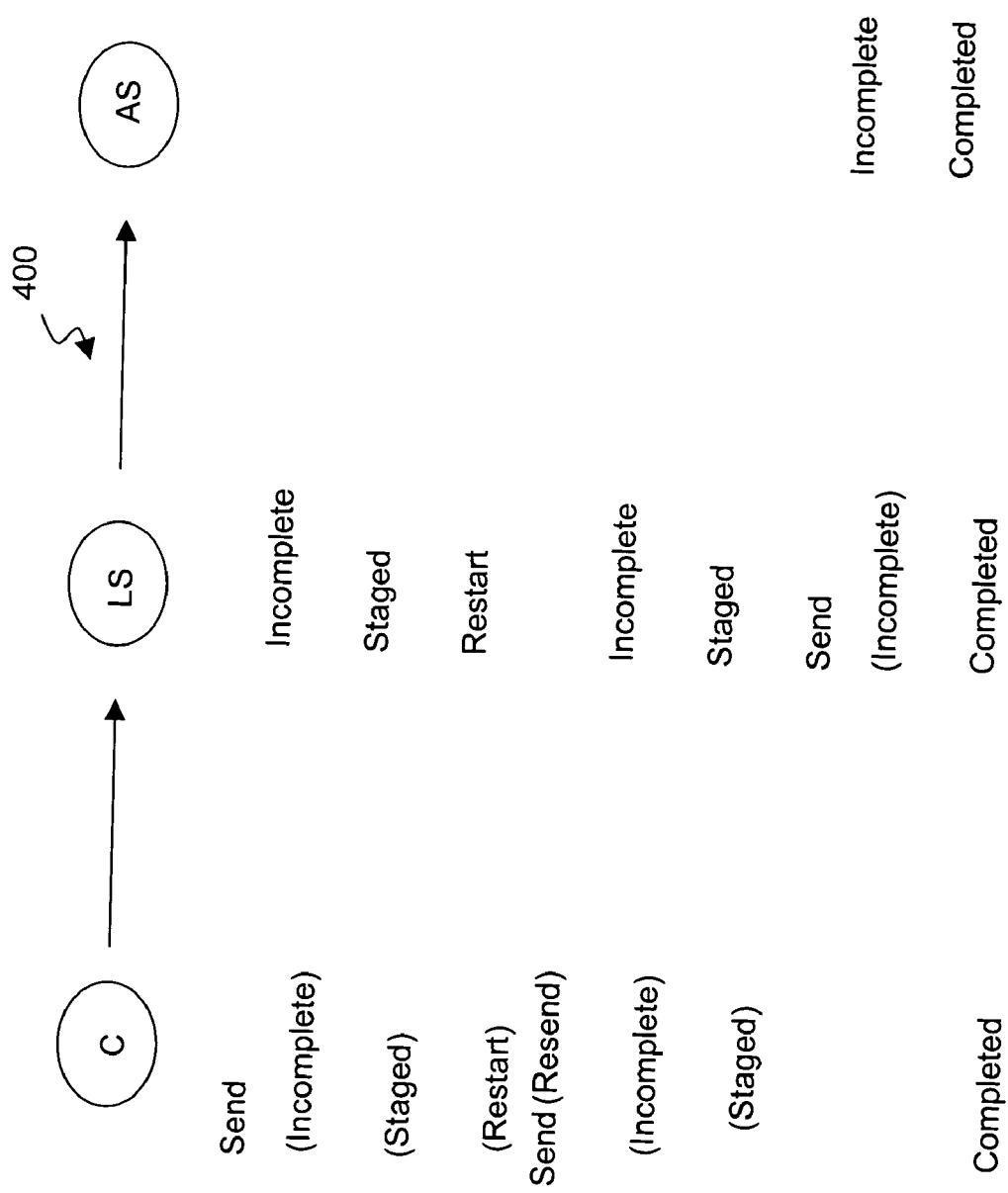
FIG. 4 is a diagram of a multi-tier file transfer process according to one embodiment of the invention.

FIG. 4 is a diagram of a multi-tier file transfer process 400 according to one embodiment of the invention. The multi-tier file transfer process 400 details the states entered for each state machine within file transfer managers at each of a client machine, a local server and an audit server. As an example, the client, the local server and the audit server as shown in FIG. 4 can respectively correspond to the clients 106, the local server 104 and the audit server 120 shown in FIG. 1.

Initially, the client sends an audit file, block-by-block, to the local server. As the local server receives the audit file, the file transfer manager is in the "incomplete" state. Once the file transfer manager at the local server has received the audit file, the file transfer manager enters the "staged" state. The client is also aware that the local server has entered the staged state. In this example, the file transfer manager at the local server at this point enters the "restart" state due to some failure of the local server. The client is informed of the restart state and starts to resend the audit file to the local server. The local server then initially enters the "incomplete" state, but subsequently enters the "staged" state once all of the audit file has been received. Next, the local server can begin to send the audit file to the audit server. Once the audit server begins to receive the audit file, the audit server enters the "incomplete" state. Once the file transfer manager at the audit server has received all of the audit file, the file transfer manager enters the "completed" state given that the audit server is the final destination for the audit file. The file transfer manager at the local server becomes aware that the file transfer has been completed and thus enters the "completed" state. Thereafter, the client becomes aware that the local server has entered the "completed" state, and thus enters the "completed" state.

The multi-tier file transfer process 400 is a representative case involving three tiers and one restart. However, it should be understood that the file transfer process is flexible and fault-tolerant such that one to many tiers can be traversed by the audit file during the transfer process and that zero to many restarts can be invoked. During transfer, the audit files are staged at each of the intervening computing machines (e.g., servers) between the client and the audit server. Hence, the file transfer process is reliable, efficient and fault-tolerant.

Figure 5:
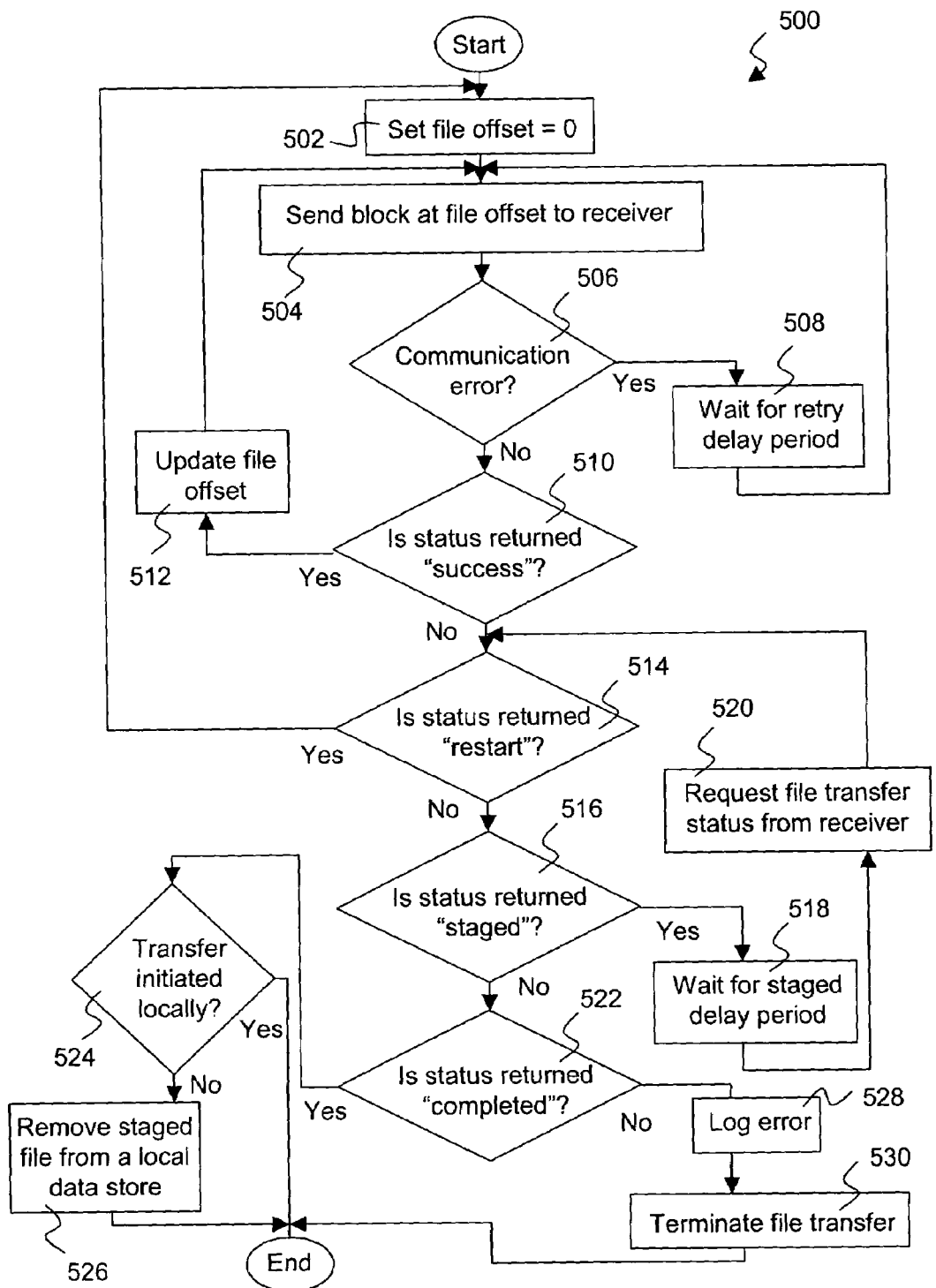
FIG. 5 is a flow diagram of a send process according to one embodiment of the invention.

FIG. 5 is a flow diagram of a send process 500 according to one embodiment of the invention. The send process 500 can, for example, be performed by a file transfer manager when sending an audit file from a sending machine over a network to a receiving machine.

The send process 500 initially sets 502 a file offset to zero (0). The audit file is partitioned into blocks to better manage the transfer of the audit file. The file offset is used to access each of the blocks. A first (next) block for the audit file at the current file offset is then sent 504 to the receiver. The receiver is the receiving machine or the receiver portion of the file transfer manager within the receiving machine. A sender is the sending machine or the sender portion of the file transfer manager within the sending machine.

A decision 506 then determines whether a communication error has resulted. When the decision 506 determines that a communication error has occurred, then the process 500 waits 508 for a retry delay period. After the retry delay period, the send process 500 returns to repeat the operation 504 and subsequent operations so that the block can again be sent.

On the other hand, when the decision 506 determines that there is no communication error, the receiver returns a status. The decision 510 determines whether the status returned by the receiver is "success". When the decision 510 determines that the status returned is "success", then the file offset is updated 512 so that a next block of the audit file can be retrieved. Following the operation 512, the send process 500 returns to repeat the operation 504 and subsequent operations so that the next block of the audit file can be sent to the receiver.

Alternatively, when the decision 510 determines that the status returned is not "success", a decision 514 determines whether the status returned is "restart". When the decision 514 determines that the status returned is "restart", the send process 500 returns to repeat the operation 502 and subsequent operations so as to restart the send process 500.

On the other hand, when the decision 514 determines that the status returned is not "restart", then a decision 516 determines whether the status returned is "staged". When the decision 516 determines that the status returned is "staged", the send process 500 waits 518 for a staged delay period. After the wait or delay for the staged delay period, the send process 500 requests 520 file transfer status from the receiver. Here, the send process 500 requests 520 (e.g., polls) the receiver to provide its current status. The status returned from the receiver is then used to repeat the decision 514 and subsequent operations so that a restart can occur if needed.

Alternatively, when the decision 516 determines that the status returned is not "staged", then a decision 522 determines whether the status returned from the receiver is "completed". When the decision 522 determines that the status returned is "completed", a decision 524 determines whether the file transfer was initiated locally. When the decision 524 determines that the file transfer was initiated locally, then the send process 500 is complete and ends as the requested sending of the audit file has successfully completed. On the other hand, when the decision 524 determines that the file transfer was not initiated locally, the staged file is removed 526 from a local data store (e.g., disk drive). In this case, the send process 500 pertains to an intermediate machine that temporarily stores a staged file in its local data store during the transmission of the audit file. Once the transfer of the audit file has successfully completed, the staged file can be removed from the local store of the intervening machine. After the operation 526, the send process 500 is complete and ends.

Further, when the decision 522 determines that the status returned is not "completed", then an error condition results because the file transfer never completes. In this case, an error is logged 528. The error can, for example, be logged in an audit file. After the error is logged 528, the file transfer is terminated 530. Thereafter, the send process 500 is complete and ends.

Figure 6A:
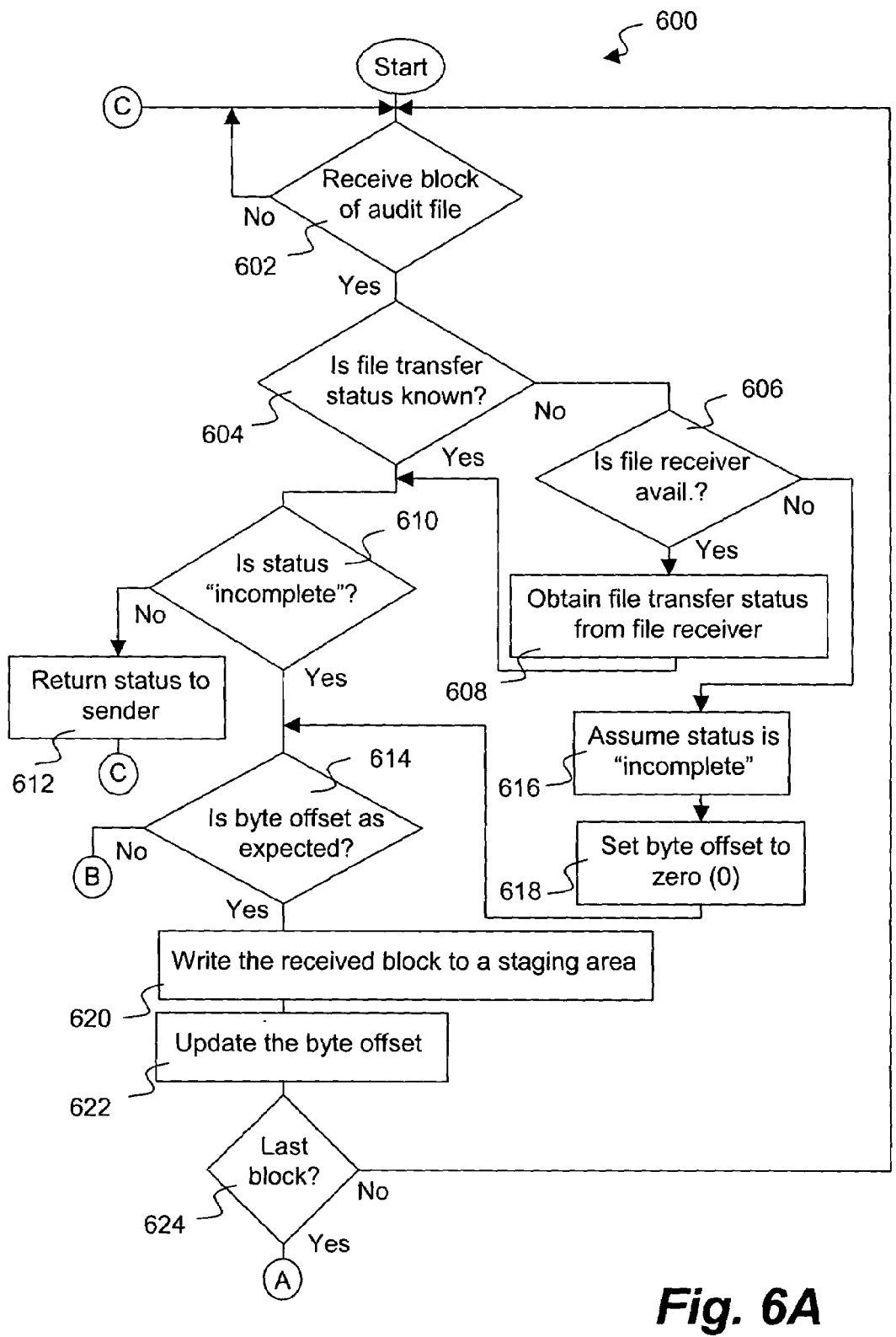
FIGS. 6A-6C are flow diagrams of a receive process according to one embodiment of the invention.
Figure 6B:
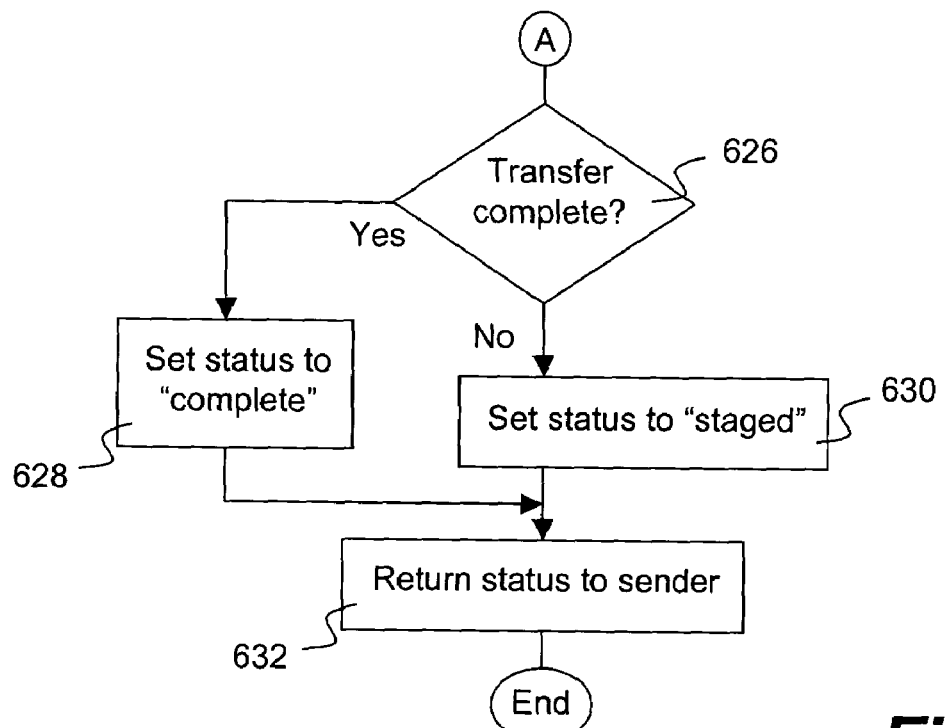
Figure 6C:
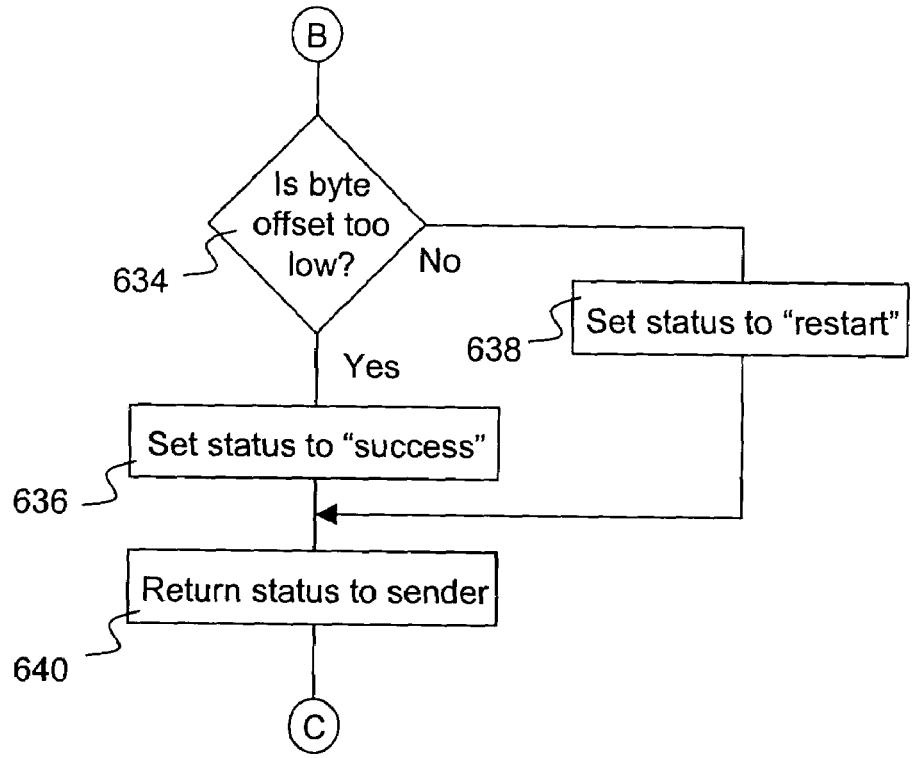

FIGS. 6A-6C are flow diagrams of a receive process 600 according to one embodiment of the invention. The receive process 600 can, for example, be performed by a file transfer manager within a receiving machine that is receiving the audit file that has been sent by a sending machine.

The receive process 600 begins with a decision 602 that determines whether a block of the audit file has been received. When the decision 602 determines that a block of the audit file has not yet been received, then the receive process 600 awaits the arrival of a block of the audit file. On the other hand, when the decision 602 determines that a block of the audit file has been received, then a decision 604 determines whether the file transfer status is known. If the receiving machine is the endpoint machine for the file transfer, then it knows its file transfer status. When the decision 604 determines that the file transfer status is not known, a decision 606 determines whether the file receiver is available. When the decision 606 determines that the file receiver is available, the file transfer status is obtained 608 from the file receiver. Following the operation 608, as well as following the decision 604 when the file transfer status is known, a decision 610 determines whether the file transfer status is "incomplete". When the decision 610 determines that the file transfer status is not "incomplete", the file transfer status can be returned 612 to the sender. The sender is the sending machine or the sender portion of the file transfer manager within the sending machine. Following the operation 612, the receive process 600 returns to repeat the decision 602 and subsequent operations so that additional blocks of the audit file can be received.

On the other hand, when the decision 610 determines that the file transfer status is "incomplete", a decision 614 can determine whether the byte offset is as expected. The byte offset provides an indication that previously sent blocks of the audit file have been properly received. Further, when the decision 606 determines that the file receiver is not available, the receive process 600 assumes 616 that the file transfer status is "incomplete", and the byte offset is set 618 to zero (0). Following the operation 618, the receive process 600 also performs the decision 614 to determine whether the byte offset is as expected.

When the decision 614 determines that the byte offset is as expected, the received block is written 620 to the staging area. Here, the received block is temporarily stored in a local memory storage (e.g., a local data store) at the receiver. At this point, the received block is staged on the receiving machine for subsequent transmission to another machine (typically in a subsequent tier). After the received block has been written 620 to the staging area, the byte offset is updated 622 to account for the reception of the block. Next, a decision 624 determines whether the received block is the last block of the audit file. When the decision 624 determines that the received block is not the last block of the audit file, the receive process 600 returns to repeat the decision 602 and subsequent operations so that additional blocks of the audit file can be received and processed in a similar manner.

Alternatively, when the decision 624 determines that the received block is the last block of the audit file, a decision 626 determines whether the transfer is "complete". Here, the status can be "complete" or "staged", depending on whether the receiving machine is the endpoint machine (i.e., destination machine) for the audit file. When the decision 626 determines that the transfer is complete, then the file transfer status is set 628 to "complete". Alternatively, when the decision 626 determines that the transfer is not complete, then the file transfer status is set 630 to "staged". Following the operations 628 and 630, the file transfer status is returned 632 to the sender. Here, the sender is informed of the file transfer status of the receiver. Following the operation 632, the receive process 600 is complete and ends.

Alternatively, when the decision 614 determines that the byte offset is not as expected, then a decision 634 determines whether the byte offset is too low. When the decision 634 determines that the byte offset is not too low, then the file transfer status is set 636 to "success". The "success" status indicates that the transfer of the audit file is proceeding successfully but is not yet "staged" or "completed". In one example, the byte offset can become too low if multiple sending machines are sending (or have sent) blocks of the same audit file to the receiving machine. On the other hand, when the decision 634 determines that the byte offset is not too low, the file transfer status is set 638 to "restart" because at least one block of the audit file has been dropped in transit. Following the operations 636 and 638, the file transfer status is returned 640 to the sender. Following the operation 640, the receive process 600 returns to repeat the decision 602 and subsequent operations so that additional blocks of the audit file can be received and processed in a similar manner.

Figure 7:
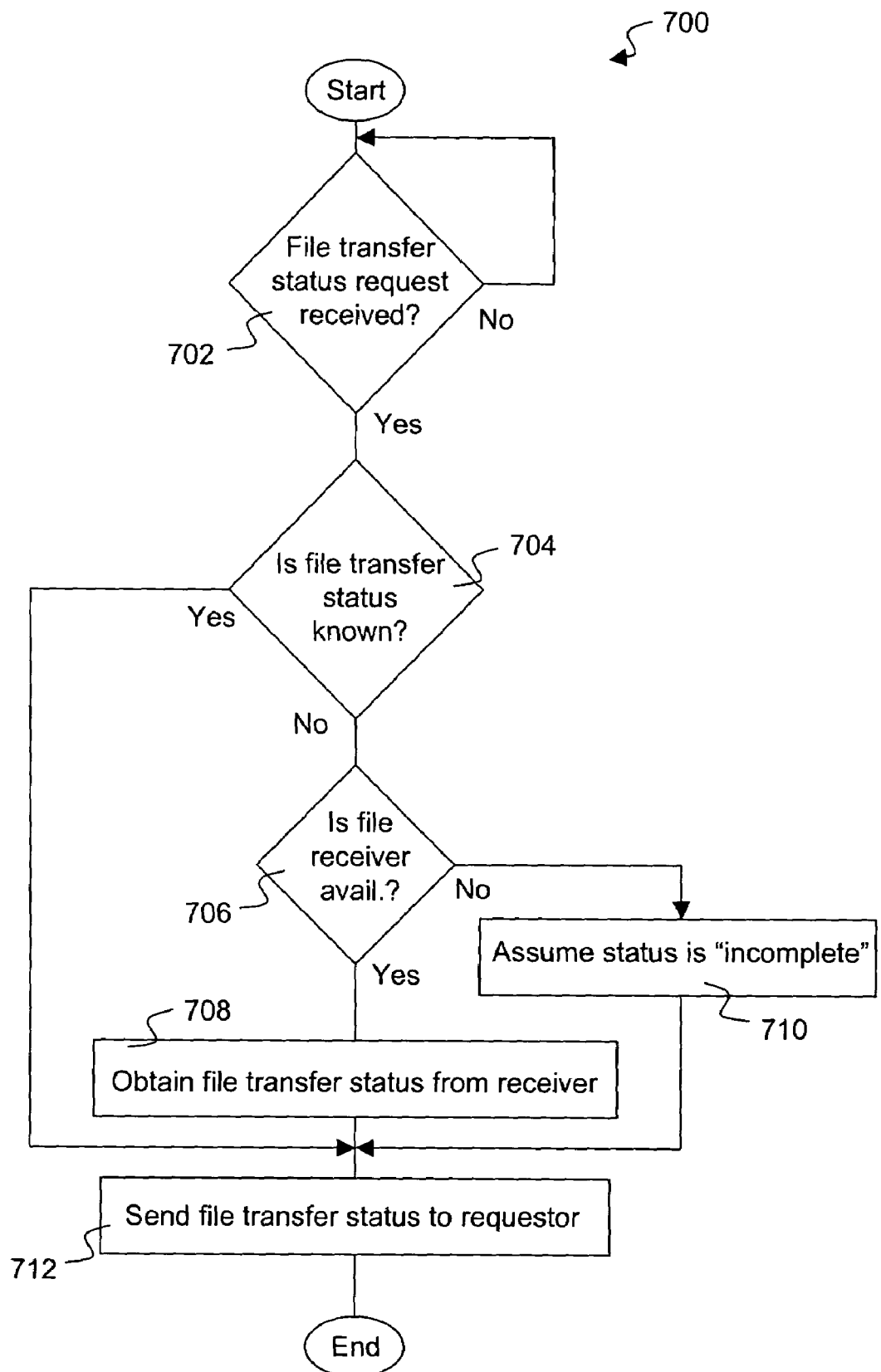
FIG. 7 is a flow diagram of a status response process according to one embodiment of the invention.

FIG. 7 is a flow diagram of a status response process 700 according to one embodiment of the invention. The status response process 700 is performed by the receiver in response to a request from the sender for the file transfer status of the receiver. For example, as shown in FIG. 5, the send process 500 can request 520 the file transfer status from the receiver.

The status response process 700 begins with a decision 702 that determines whether a file transfer status request has been received. For example, the file transfer status request can be initiated by the request 520 for the file transfer status as shown in FIG. 5. When the decision 702 determines that a file transfer status request has not yet been received, then the status response process 700 awaits such a request. Alternatively, when the decision 702 determines that a file transfer status request has been received, a decision 704 determines whether the file transfer status is known. Here, it should be understood that the endpoint machine (i.e., destination machine) of a file transfer is the ultimate authority on the status of the file transfer. Hence, the file transfer status is known when the receiver is the endpoint for the file transfer.

When the decision 704 determines that the file transfer status is not known, then a decision 706 determines whether the file receiver is available. When the decision 706 determines that the file receiver is available, then the file transfer status is obtained 708 from the receiver. On the other hand, when the decision 706 determines that the file receiver is not available, then the file transfer status is assumed 710 to be "incomplete". Following the operations 708 and 710, as well as following the decision 704 when the file transfer status is known, the file transfer status is sent 712 to the requestor (the sender). Following the operation 712, the status response process 700 is complete and ends.

In a file security system, it is not uncommon to have multiple tiers of computing machines. Since each of these machines can often participate in sending and receiving of audit files, the file transfer managers and the processing therefore in FIGS. 5-7 can be multi-threaded so that many simultaneous audit file transfers can occur.

Figure 8:
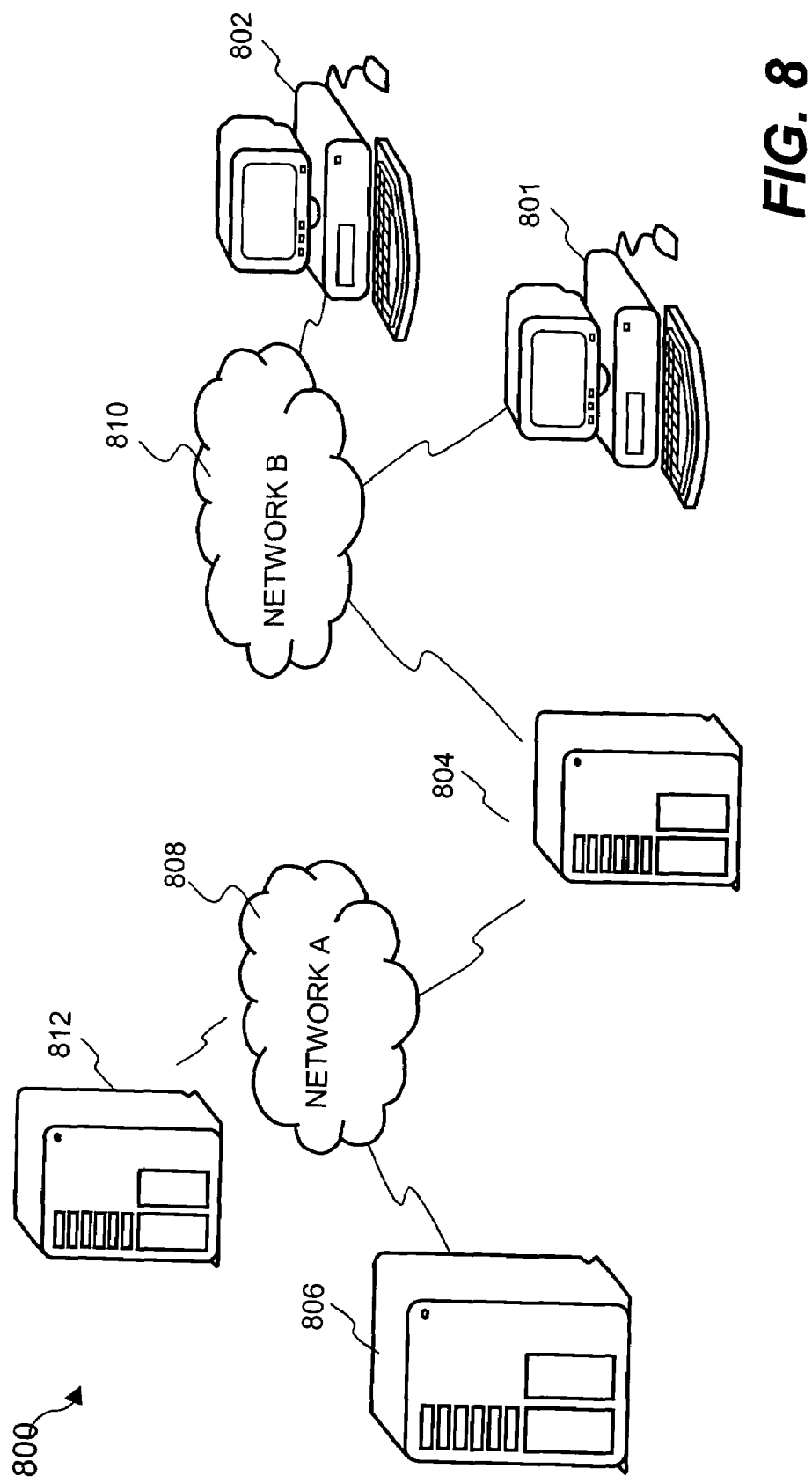
FIG. 8 shows a basic security system in which the invention may be practiced in accordance with one embodiment thereof.

FIG. 8 shows a basic security system 800 in which the invention may be practiced in accordance with one embodiment thereof. The security system 800 may be employed in an enterprise or inter-enterprise environment having a network A 808 and a network B 810. The security system 800 includes a first server 806 (also referred to as a central server) providing centralized access management for the enterprise. The first server 806 can control restrictive access to files secured by the security system 800. To provide dependability, reliability and scalability of the system, one or more second servers 804 (also referred to as local servers, of which one is shown) may be employed to provide backup or distributed access management for users of client machines serviced locally. For illustration purposes, there are two client machines 801 and 802 being serviced by a local server 804. Alternatively, one of the client machines 801 and 802 may be considered as a networked storage device.

Additional details on a security system can be found in U.S. patent application Ser. No. 10/075,194, filed Feb. 12, 2002, and entitled "SYSTEM AND METHOD FOR PROVIDING MULTI-LOCATION ACCESS MANAGEMENT TO SECURED ITEMS," which is hereby incorporated by reference for all purposes.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The advantages of the invention are numerous. Different embodiments or implementations may yield one or more of the following advantages. One advantage of the invention is that files (e.g., audit files) are able to be reliably and efficiently transmitted through a network. Another advantage of the invention is that the transfer of audit files is able to traverse a multi-tier network by staging the audit files at intermediate machines. Still another advantage of the invention is that audit files can be transmitted through a multi-tier network even when redundant computing machines are provided within the multiple tiers.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for transferring a file from a local client to a remote server in a fault-tolerant manner, said method comprising:
   (a) identifying a file to be transferred;
   (b) dividing the file into a plurality of blocks;
   (c) sending a next block of the plurality of blocks of the file to a receiver;
   (d) receiving a returned status from the receiver;
   (e) evaluating the returned status;
   (f) repeating said sending (c), said receiving (d) and said evaluating (e) when the returned status is a predetermined incomplete status;
   (g) waiting for a predetermined period of time when the returned status is a predetermined staged status, the staged status for indicating that the file has been transferred to the receiver but has not reached a final destination;
   (h) requesting, following said waiting (g) for the predetermined period of time, an updated status from the receiver when the returned status is the predetermined staged status; and
   (i) concluding the transfer of the file when the returned status is a predetermined complete status.

2. A method as recited in claim 1, wherein said method further comprises:
   (j) restarting said method, prior to said concluding (h), when the returned status is a predetermined restart status.

3. A method as recited in claim 1, wherein the file is an audit file.

4. A method as recited in claim 3, wherein the audit file is associated with a file security system.

5. A method as recited in claim 4, wherein the audit file includes at least a log of security events from the file security system.

6. A computer-implemented system, comprising:
- an identifying module configured to determine a file to be transferred from a first server to a second server;
- a dividing module configured to divide the determined file into a plurality of blocks;
- a transmitting module configured to transmit a next block of the plurality of blocks; and
- a file transfer manager configured to control the transmitting module based on a received status identifier from the second server, wherein when the returned status identified is
- a predetermined incomplete status, the transmitting module transmits the next block,
- a predetermined staged status, the transmitting module delays transmitting the next block, the staged status for indicating that the file has been transferred to the second server but has not reached a final destination, and
- a predetermined complete status, the transmitting module stops transmitting as all respective blocks of the plurality of blocks have been transmitted.

7. The system of claim 6, wherein the file transfer manager is configured to control the transmitting module, such that the transmitted module restarts transmitting the blocks from a first block when a predetermined restart status is received at the filed transfer manager from the second server.

8. The system of claim 6, wherein the determined file comprises an audit file.

9. The system of claim 8, wherein the audit file comprises a log of events associated with the first server.

10. A tangible computer-readable storage medium containing instructions for controlling at least one processor to carry out a method comprising:
(a) identifying a file to be transferred;
(b) dividing the file into a plurality of blocks;
(c) sending a next block of the plurality of blocks of the file to a receiver;
(d) receiving a returned status from the receiver;
(e) evaluating the returned status;
(f) repeating said sending (c), said receiving (d) and said evaluating (e) when the returned status is a predetermined incomplete status;
(g) waiting for a predetermined period of time when the returned status is a predetermined staged status, the staged status for indicating that the file has been transferred to the receiver but has not reached a final destination;
(h) requesting, following said waiting (g) for the predetermined period of time, an updated status from the remote receiver when the returned status is the predetermined staged status; and
(i) concluding the transfer of the file when the returned status is a predetermined complete status.

11. A computer program product comprising a tangible computer useable storage medium having computer program logic recorded thereon for enabling a processor to transfer a file between first and second servers, the computer program logic comprising:
- means for identifying a file to be transferred;
- means for dividing the file into a plurality of blocks;
- means for sending a next block of the plurality of blocks of the file to a receiver;
- means for receiving a returned status from the receiver; and
- means for evaluating the returned status, wherein when the returned status is a predetermined incomplete status the sending, receiving, and evaluating are repeated,
- when the returned status is a predetermined staged status, the means for sending is delayed a predetermined period of time, the staged status for indicating that the file has been transferred to the receiver but has not reached a final destination,
- when the returned status is the predetermined staged status, the means for receiving requests an updated status from the remote receiver after the predetermined period of time, and
- when the returned status is a predetermined complete status the transfer of the file is concluded.

* * * * *